Sept. 20, 1960  L. B. LYNN  2,953,149
DYNAMIC RESPONSE VALVE
Filed June 19, 1957  3 Sheets-Sheet 1

Sept. 20, 1960             L. B. LYNN             2,953,149

DYNAMIC RESPONSE VALVE

Filed June 19, 1957                                3 Sheets-Sheet 3

United States Patent Office 2,953,149
Patented Sept. 20, 1960

2,953,149

DYNAMIC RESPONSE VALVE

Lawrence B. Lynn, Wilkinsburg, Pa., assignor to Westinghouse Electric Corporation, East Pittsburgh, Pa., a corporation of Pennsylvania Filed June 19, 1957, Ser. No. 666,697

11 Claims. (Cl. 137—85)

This invention relates to a dynamic response valve and more particularly to a control valve capable of responding to rapid, high velocity input signals to the valve while at the same time attenuating output response to lower input frequencies to zero for steady state input signals.

In some previous control systems involving control valves for fluid actuators, it has been found necessary to provide discrimination of this type, in order to achieve required response characteristics. One method of accomplishing this result is to provide the system with electric feedback signals of adequate size and proper phase relationship to eliminate or reduce the unwanted control. A system of this nature, however, becomes rather complex and often is found to be inadequate or incapable of eliminating the low frequency, undesirable input signals without effecting the proper high frequency output of the control system.

It is therefore an object of this invention to provide a gyro control valve for a work actuator capable of responding to dynamic changes.

It is another object of this invention to provide a gyro control valve capable of positive and rapid response to gyro input changes.

It is another object of this invention to provide a dynamic control valve capable of eliminating output response to steady state or low frequency input signals.

It is another object of this invention to provide a fluid control piston capable of removing output changes to a work actuator during sustained or low frequency input signals to the control valve for the work actuator.

It is another object of this invention to provide a gyro capable of varying sensitivity in direct ratio to an input control pressure established by the velocity of a vehicle when the gyro and valve are used in connection with a moving vehicle.

Other objects, purposes, and characteristic features will become clear as the specification progresses.

In practicing this invention, there is provided a gyro actuated multi-stage control valve having a rapid response with a first stage and a second stage of greater capacity. The first stage of the control valve is capable of response to gyro or other input signals for providing variable fluid output signals to the higher capacity second stage. The second stage in turn provides work actuator fluid pressures proportional to the output control pressures of the first stage. A valve of this nature responds to any input signal whether the signal be of long or short duration. For frequency discrimination, there is provided an additional pressure responsive device capable of responding to the output pressures of the first stage in a direction opposite to the input signal, and having a magnitude that is a function of the frequency to the input signal. If the input signal is of long duration, the pressure responsive device will return the first stage fluid control member to a null position, neutralizing the differential pressures applied to the second stage. If, however, the input signal is of short duration, the effects of the opposing fluid pressure device will not be felt thus resulting in output fluid pressures to the second stage. The second stage then in turn controls a work actuator to drive a load in the direction and of an amount indicated by the input signal to the first stage. The input signal to the first stage is also varied in amplitude through the use of a pressure responsive section capable of responding to variable pressures resulting from the movement of the gyro valve through a fluid medium while attached to a vehicle. For example, if the valve is used on an aircraft passing through the atmosphere the gyro would have centering restraint proportional to the aircraft speed.

In each of the several views, similar parts bear like reference characters.

Figure 1:
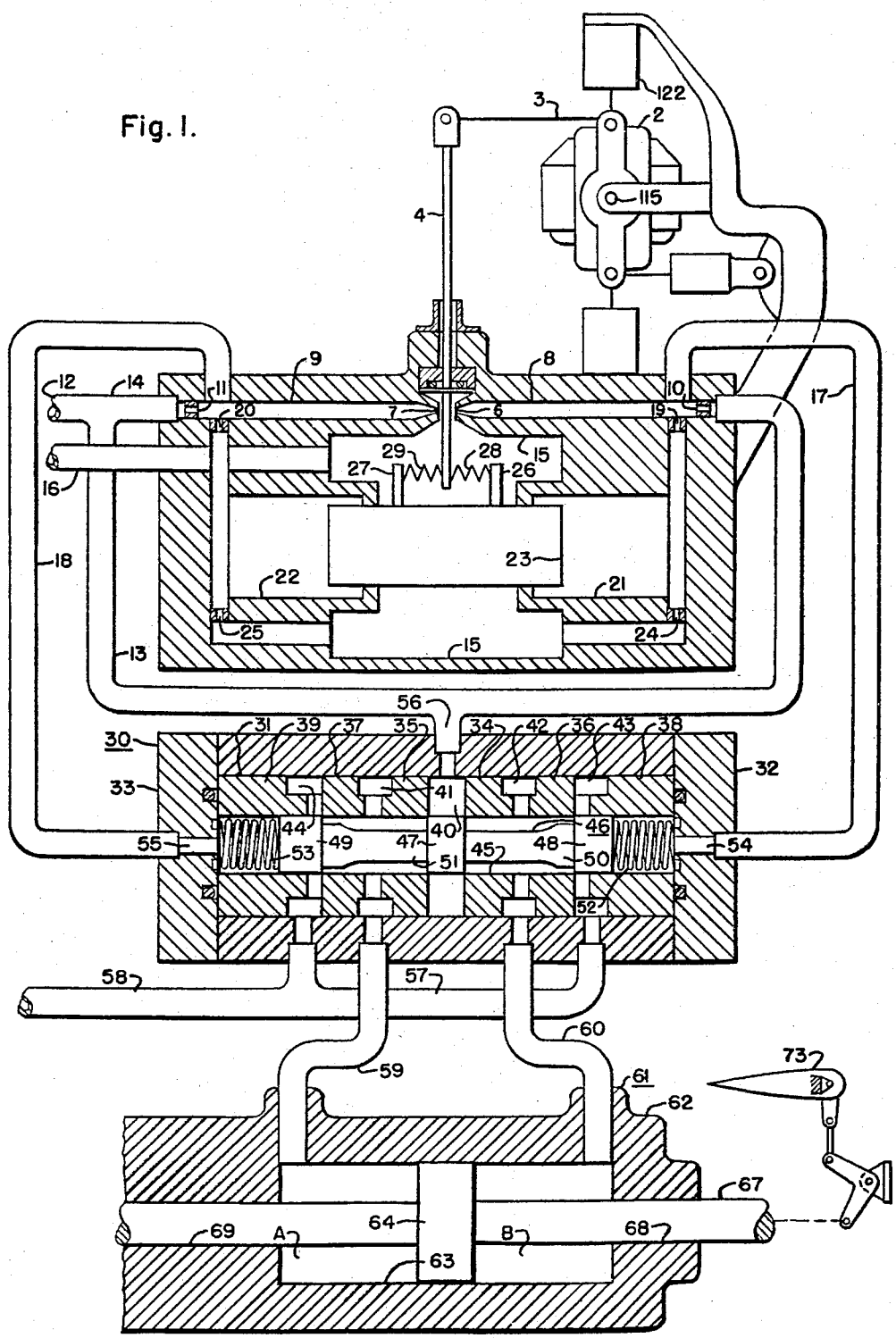
Figure 1 is a diagrammatic sectional view of a two-stage control valve provided with gyro input control signals and a linear type of work actuator responsive to output signal of the two-stage valve.

The control valve of Fig. 1 can be separated into two major components or stages. The first stage comprises a gyro 1 having a pivoted gimbal 2, a control drive rod and securing pivot 3 and a fluid control vane 4 capable of being displaced by the gyro in response to its movement. The fluid control vane 4 is pivotally secured to the first stage valve body 5 in a position capable of allowing the vane 4 to cooperate with a pair of opposing spaced apart orifices 6 and 7. The orifices 6 and 7 are supplied with fluid under pressure through the fluid pipes 8 and 9, respectively, provided with restricted openings 10 and 11, respectively, the purposes of which will be explained hereinafter. Fluid is delivered to the restricted openings 10 and 11 from the pipe 12 through the pressure pipes 13 and 14, respectively. With the control vane 4 in a position midway of the orifices 6 and 7 and with fluid being delivered to the pressure pipes 13 and 14, it can be seen that fluid will pass through the restricted openings 10 and 11, the pipes 8 and 9 and the orifices 6 and 7 and empty into a reservoir 15 to be returned through the fluid pipe 16 to a sump of fluid, not shown. As the fluid passes through the restricted openings 10 and 11 in its movement toward the orifices 6 and 7, it should be clear that a pressure reduction takes place making the fluid pressure within the pipes 8 and 9 at a pressure below the supply pressure within the pipe 12. With the vane 4 of the gyro 1 in its mid-point or neutral position, it can be seen that the pressure within the pipes 8 and 9 are of equal level. As gyro 1 signal is provided to the control vane 4 deflecting the vane 4 toward one side or the other of its neutral position, a restriction of one of the orifices 6 or 7 occurs while at the same time the other of the orifices 6 and 7 becomes relieved. This results in an increase in one of the pressure supply pipes 8 and 9 and a decrease in the other of the same pipes. This differential in pressure is then delivered to the second stage of the control valve through the pipes 17 and 18. The pipes 17 and 18 then become the control pressure pipes for the second stage of the valve.

The fluid under pressure within the pipes 8 and 9 is provided with an additional flow path through restricted openings 19 and 20, respectively and into the cylinders 21 and 22, respectively, associated with a filter feedback piston 23 the action of which will be explained hereinafter. The cylinders 21 and 22 are provided with passages to the fluid reservoir 15 through restricted openings 24 and 25, respectively. It should be clear therefore that fluid flowing from the fluid supply pipe 12 through the restricted openings 10 and 11 and the restricted openings 19 and 20 experiences a pressure reduction before it enters into cylinders 21 and 22 of the feedback piston 23. This fluid is then provided with a return flow path through the restricted openings 24 and 25 into the fluid reservoir 15 and return pipe 16.

The feedback piston 23 is provided with a pair of upstanding arms 26 and 27 secured thereto within the portion of the piston 23 located within the return fluid reservoir 15. The upstanding arms 26 and 27 are positioned on opposite sides of the free end of the vane 4 of the gyro 1. The vane 4 is then connected to the upstanding arms 26 and 27 by the springs 28 and 29, respectively, each of which normally has low stiffness. The purpose of the piston 23 and its connection to the vane member 4 will be explained hereinafter in connection with the operation of this control valve.

The second stage of the control valve comprises a body portion 30 having a center opening 31 and a pair of end closure caps 32 and 33. The center opening 31 is provided with a plurality of inserted rings 34, 35, 36, 37, 38 and 39 capable of forming an annular fluid flow passage 40, annular fluid work output passages 41 and 42, and a pair of annular fluid return passages 43 and 44. The rings 34 through 39 when placed in position within the opening 31 form a center bore 45 for housing a spool valve 46. The spool valve 46 is provided with a center land area portion 47 and two end land area portions 48 and 49 held in spaced apart relationship with the center land area portion 47 by the arms 50 and 51 respectively. The center land area 47 is of a length capable of exactly covering the annular opening 40 and the arms 50 and 51 are of a length to position the end land area portions 48 and 49 over the annular openings 43 and 44 with the edges of the land areas 48 and 49 adjacent the arms 50 and 51 exactly aligning with the inner edges of the annular openings 43 and 44. Positioned between the spool valve 46 and end caps 32 and 33 are a pair of centering springs 52 and 53. The springs 52 and 53 act to aid the pressures within the pipes 17 and 18 when these pressures are equal and opposite to maintain the spool valve 46 in the previously described center position. The control pipe 17 is secured to the end cap 32, in any suitable manner and opens through the cap opening 54 into the center bore 45 adjacent the end land area portion 48 of the spool valve 46. Similarly, the fluid control pipe 18 is secured to the end cap 33, by any suitable means, and is ported into the central bore 45 through the end cap opening 55 adjacent the end portion 49 of the spool valve 46.

The annular groove 40 is supplied with fluid under pressure from the fluid supply pipe 13 through the fluid pressure pipe 56. The annular grooves 43 and 44 are interconnected by the pipe 57, which is in turn connected to the return pipe 58 capable of returning the fluid to the sump, not shown. The annular grooves 41 and 42 are connected through the pipes 59 and 60 to a work actuator 61. The work actuator shown herein is a piston and cylinder type of device, however, any other suitable fluid control actuator can be used. As shown here, the work actuator comprises a body portion 62 provided with a cylindrical opening 63 having a piston 64 positioned for movement therein. The piston 64 is centered in the cylinder 63 compressed forming a pair of chambers A and B. The piston 64 is also provided with a piston rod 67 slidable in suitable bearings 68 and 69 positioned within the housing 62. With this arrangement, it can be seen that fluid under pressure being delivered through the pipe 59 to the work actuator 61 causes an expansion of the chamber A, formed by the piston 64 and a portion of the cylinder 63 to the left of the piston 64, as shown in the drawings, causes the movable piston 64 to be displaced to the right as shown in the drawings. While this action takes place, the fluid in chamber B, formed by the piston 64 and the portion of the cylinder 63 to the right of the piston 64, is provided with an outgoing or return passage through the return control pipe 60 as will be explained hereinafter.

Control of the two-stage control valve for causing actuation of the work actuator may be provided for the purpose of stabilizing an aircraft during normal manual control periods. For example, if this valve were used in the regulation of a control surface 73 directing an aircraft, the control surface (through periods of generally stable flight) would be directed by the gyro stabilizing system for maintaining the attitude of the aircraft. This signal however, at the discretion of the aircraft operator, can be overcome by manual control signals to provide control of the work actuator and result in a desired movement of the aircraft control surface. During periods of autopilot control (not shown) however, the stability value of this invention would ordinarily not be required.

Operation of the control valve of Fig. 1 of this invention will now be described. During periods of absence of manual operator signals, the gyro 1 would respond to minor displacements of the aircraft throughout its flight to provide input signals to the first stage of the control valve of this invention. These input signals, result in a deflection of the control vane 4. If we assume that the gyro displacement signal is in a direction to cause control vane 4 to deflect in one direction, say to the left as shown in the drawing, it can be seen that fluid flow through the orifice 7 becomes restricted while at the same time fluid flow through the orifice 6 becomes relieved. This results in an increase in pressure within the pipe 9 and a decrease in pressure within the pipe 8. The change in pressure within the pipes 8 and 9 results in pressure changes within the cylinders 21 and 22, with a dynamic drop in the pressure within the cylinder 21 and a dynamic rise in pressure within the cylinder 22. In order to satisfy a state of equilibrium, it is necessary for the piston 23 to move to the right as shown in the drawing at a velocity capable of satisfying the dynamic difference in pressure within the cylinders 21 and 22. Displacement of the piston 23 to the right causes a force to be applied to the vane member 4 through the arms 26 and 27 and the springs 28 and 29. During the period of movement of the vane member 4 from its midpoint position to its extreme position a change in pressure within the pipes 8 and 9 causes a corresponding displacement of the second stage of the control valve and thus a displacement of the work actuator. In this assumption of the control of the vane member 4 being moved to the left, as shown in the drawings, the resultant pressure change is in the direction of higher pressure within the pipe 18 and a reduction of pressure within the pipe 17. The increase in pressure within the control pipe 18 results in a displacement of a spool valve 46 to the right, as shown in the drawings, causing the spool valve 46 to allow fluid under pressure to pass the land area 47 into the central bore 45 and out through the annular opening 41 to the fluid control pipe 59 and into the chamber A of the work actuator 61. At the same time the end land area 48 of the spool valve 46 opens the annular opening 43 to the central bore 45 for allowing fluid to pass from the work actuator 61 and into the chamber B through the pipe 60 into the annular opening 42, past the land area 48 and out through the fluid return pipes 57 and 58. This then results in a piston 64 movement to the right as viewed in the drawings.

If the original signal had been in the opposite direction of gyro displacement, the vane member 4, piston 23, spool valve 46 and work actuator piston 64 would all have moved in a direction opposite to the previously described direction. If the input signal is of short duration the force applied to the vane member 4 through the springs 28 and 29 is small, since only a slight displacement of piston 23 can occur. However, if the incoming signal is of a long duration or steady state, piston 23 can displace as far as required to load springs 28 and 29 to provide a centering torque to the vane member 4 for returning the vane to its midpoint or null position.

Figure 2:
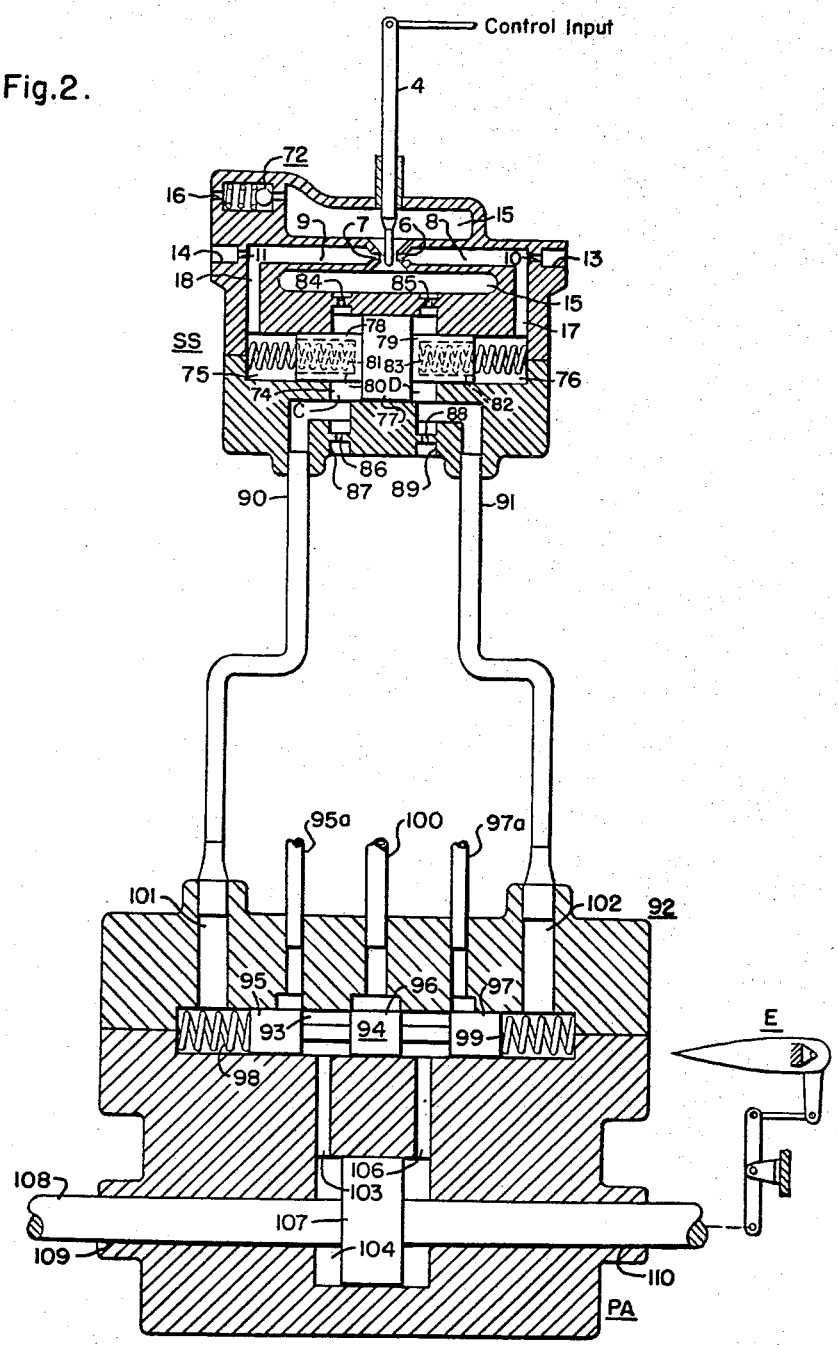
Fig. 2 is a sectional view of a modified embodiment of the two-stage control valve used to control boost valve and work actuator of the linear type.

The embodiment of the invention shown in Fig. 2, is one in which the steady state signals are reduced or eliminated in the second stage of the valve rather than the first stage as set forth in the description of Fig. 1. The first stage of this valve comprises a gyro controlled vane 4 positioned midway between two fluid orifices 6 and 7 supplied with fluid through the pressure inlet pipes 13 and 14. The pressure inlet pipes 13 and 14 are provided with restrictions 10 and 11 respectively for establishing the reduced pressure zones within pipes 8 and 9 between the restricted openings 10 and 11 and orifices 6 and 7, respectively. Fluid flow through the orifices 6 and 7 is exhausted into the chamber 15 and passed out through the pressure level maintenance valve 72 to the return port 16 for return to a sump or reservoir, not shown. The pressure level maintenance valve 72 is a spring biased ball valve provided in the return flow passage for maintaining a desired pressure level within the return chamber 15. The reduced pressure zone pipes 8 and 9 are connected to the second stage SS of the control valve by the control pipes 17 and 18.

The second stage control valve SS is provided with a central cylinder 74 having outwardly projecting cylinders 75 and 76 of the smaller diameter. The cylinders 75 and 76 open into the central larger diameter cylinder 74 and are terminated at their opposite ends by the housing of the second stage SS. Positioned within the cylinder 74 is a piston 77 having outwardly extending smaller central piston members 78 and 79. The piston 77 is of a diameter equal to the cylinder 74 while the pistons 78 and 79 are of a diameter equal to the diameter of the cylinders 75 and 76. The piston 78 is provided with a recess 80 for receiving a bias spring 81, the purpose of which will be described hereinafter. The piston 79 is provided with a recess 82 for receiving a bias spring 83. With the bias springs 81 and 83 positioned within the respective piston recesses and engaging the body portion 73 of the second stage the pistons 77, 78 and 79 are biased to a mid or neutral position within the cylinders 74, 75 and 76. The cylinder 75 is connected to the fluid control pipe 18 at its outer extremity and the cylinder 76 is connected to the pressure control pipe 17 at its outer extremity. It, therefore, can be seen that fluid pressures found within the fluid pipes 18 and 17, are also found within the cylinders 75 and 76, respectively, for action against the pistons 78 and 79, respectively.

The piston 77 biased to a midpoint in the length of the cylinder 74 forms chambers C and D to the left and right of the piston, respectively, as viewed in Fig. 2. The chamber C is supplied with fluid under pressure from the fluid return reservoir 15 through an orifice 84 while the chamber D is supplied with fluid under pressure from the fluid return reservoir by an orifice 85. Since the valve is one in which output control pressures occur only during change periods or dynamic periods. it is necessary to provide a fluid return path for the chambers C and D. Fluid return flow therefor is provided for the chamber C through the orifice 86 to a fluid return pipe 87 to the main reservoir, not shown. Likewise, the chamber D is provided with a fluid return through the orifice 88 and fluid return pipe 89 to the main fluid reservoir, not shown. The chambers C and D are also provided with output control pipes 90 and 91 for providing output control pressures to a boost spool valve 92 which in turn controls a power fluid actuator PA.

The fluid boost valve 92 comprises a cylinder 93 containing a spool valve 94 provided with three spaced apart land areas 95, 96 and 97. The spool valve 94 is centered within the cylinder 93 by a pair of bias springs 98 and 99 such that the land area 96 interrupts a fluid pressure pipe 100 to eliminate fluid delivery to the power actuator. The land areas 95 and 97, when centrally positioned by the bias springs 98 and 99 interrupt a pair of fluid exhaust passages 95a and 97a, respectively.

The fluid output control pipe 90 of the second stage control valve is then connected through a fluid opening 101 to the area containing the bias spring 98 adjacent the land area 95 of the spool valve 94. Likewise, the fluid output control pipe 91 of the second stage of the control valve is connected to a fluid delivery pipe 102 opening into the cylinder 93 adjacent the bias spring 99 for supplying fluid control pressure to the land area 97 of the spool valve 94. The area of the cylinder 93 between the land area 95 and land area 96 of the spool valve 94 is provided with a fluid passage 103 into a cylinder 104 of the power actuator PA. Likewise, the area of the cylinder 93 between the land areas 96 and 97 of the spool valve 94 is provided with a fluid passage 106 into the cylinder 104 of the power actuator PA. Positioned midway between the fluid passages 103 and 106 within the cylinder 104 is a piston 107. The piston 107 is provided with a piston rod 108 received within suitable bearings 109 and 110. The piston rod 108 may be utilized to drive any suitable load such as, for example, the control surface E of an aircraft.

Operation of this embodiment will now be explained. If we assume that the gyro 1 of Fig. 1 causes the vane member 4 to deflect to the left, of the view of Fig. 2, a restriction of the flow of fluid through the orifice 7 into the chamber 15 occurs. At the same time, fluid flow through the orifice 6 becomes relieved due to an increase in fluid flow space between the orifice 6 and the vane 4. This action results in an increase in pressure within the pipe 9 and decrease in pressure within the pipe 8. The action also results in an increase in the pressure within the fluid control pipe 18 in the cylinder 75 in the second stage SS and a decrease in pressure within the fluid control pipe 17 and in the cylinder 76 of the second stage. This change in pressure results in a displacement of the pistons 77, 78 and 79 to the right as viewed in the drawings, an amount allowed by the fluid in the chambers C and D and the springs 81 and 83. During the movement of the piston 77 to the right, there is a dynamic increase in pressure within the chamber D and a dynamic decrease in the pressure within the chamber C. Since fluid within the chamber D can only escape through the orifice 88 for return to the return pipe 89 at a restricted rate and fluid entry into the chamber C through the orifice 84 from the reservoir 15 can enter only at a restricted rate. The dynamic pressure change within the chambers C and D causes an increase in output pressure within the fluid control pipe 91 and a decrease in the output pressure within the control pipe 90. This pressure variation within the two fluid control pipes causes an increase in pressure or the land area 97 of the spool valve 94 and a decrease in pressure on the land area 95 of the spool valve 94. This causes a displacement of the spool valve 94 to the left as viewed in the drawings resulting in fluid being delivered from the pressure pipe 100 past the land area 96 of the spool valve 94 through the fluid pipe 106 into the cylinder 104 to the right of the piston 107. This results in a displacement of the piston 107 to the left as viewed in the drawings. The spool valve 94, while being displaced to the left by the increase in pressure within the fluid control pipe 91, also displaces its land area 95 to the left opening the fluid return pipe 95a to the fluid control pipe 103 of the power actuator PA. Movement of the piston 107 to the left, therefore, causes fluid to be exhausted through the pipe 103, past the land area 95 and out through the fluid return pipe 95a. When the output of the power actuator satisfies the error correction on the vehicle carrying the gyro then the gyro will cease to displace the vane member 4 in any additional amount. For this reason, the piston 77 will become stable in its displaced position due to the balance of pressures against the bias springs 81 and 83. When this occurs, fluid pressures within the chambers C and D then become equalized causing the fluid boost valve 94 to again return to its midpoint position and stabilize the fluid power actuator PA in its displaced position. When the gyro 1 is called upon to again neutralize the power actuator PA, a reverse action to the previously described action takes place resulting in the vane member 4 being moved to the right, the piston 77 being moved to the left, the spool valve 94 being moved to the right and a power actuator piston 107 also being moved to the right as shown in the drawings. Since this operation is identical in description to the previously described operation, it will not be again described in detail.

Figure 3:
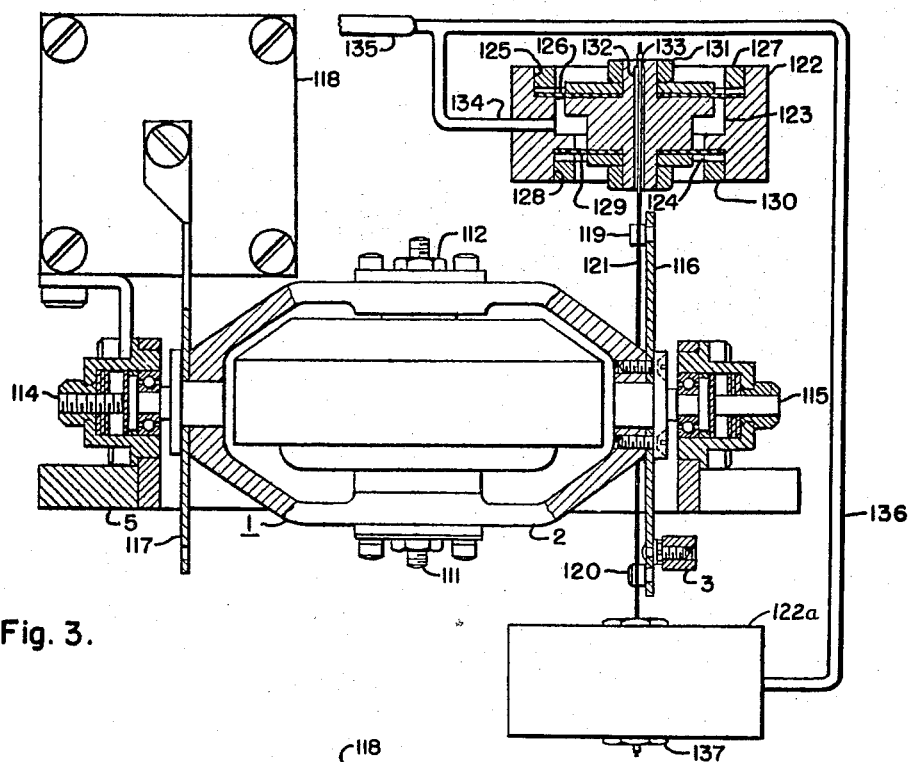
Fig. 3 is a sectional view showing the details of the sensing gyro utilized to operate the multi-stage of Figs. 1 and 2; and, Fig. 4 is an elevational view showing the details of the relationship between the control gyro and its sensitivity and damping control members.
Figure 4:
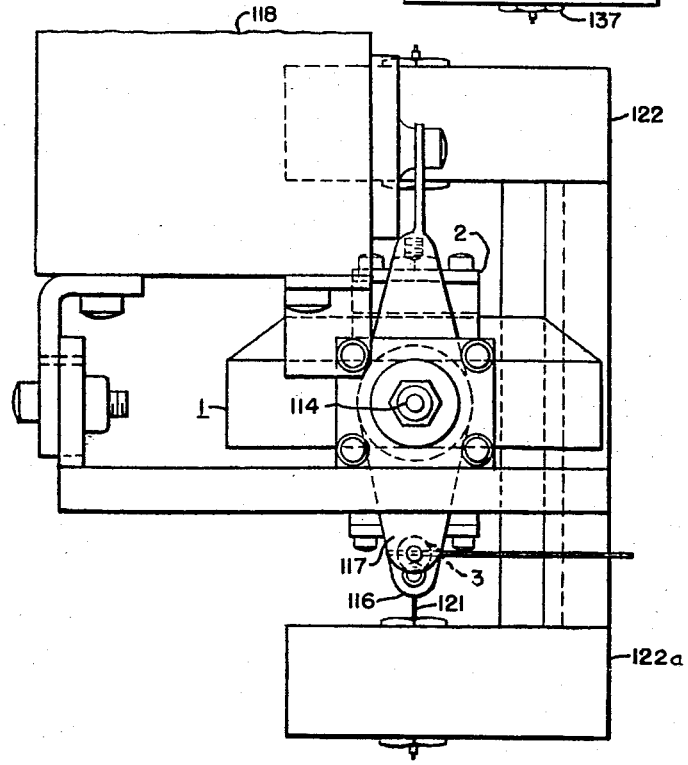

The gyro 1 when used on a vehicle such as an aircraft capable of operation through a great range of speeds, such for example involving range of speeds mach 0.1 to more then mach 1.0 will be called upon to provide adequate stabilization augmentation over the entire range without over or under-control. For this reason, a pressure sensitive gain device is provided for varying the actual movement of the gyro on its pivots. This structure is shown in Figs. 3 and 4 and is set forth as follows. The gyro 1 is provided with pivots at points 111 and 112, not shown in detail in these views, for supporting the gyro on a gimbal 2 which is capable of moving about pivots 114 and 115. The pivots 114 and 115 are rigidly mounted on the valve body 5 in any suitable manner. The gimbal 2 is provided with a pair of control arms 116 and 117 located adjacent the ends of the gimbal supported by the pivots 115 and 114 respectively. The arm 117 is connected to a damping device, the structure of which is not shown since it forms no part of this invention, but may be of any well known type such as a magnetic type of damping. The arm 116 is provided with a pair of securing pins 119 and 120 capable of receiving a flexible member 121 usually of steel wire construction. The flexible member 121 is secured to the pins 119 and 120 in any suitable manner, such as passing through openings or grooves therein. The flexible member then extends outwardly beyond the ends of the arm 116 to be secured within the pressure responsive members 122 and 122a. Since the members 122 and 122a are identical in structure, the structure of the member 122 only will be described in detail.

The member 122 is provided with a central opening 123 passing therethrough. The opening 123 is provided with a reduced diameter portion 124 adjacent one end of the pressure device 122. Positioned within a step 125 of the opening 123 is a diaphragm 126 secured in position on the step 125 by a securing ring 127. Secured within a step 128 in the reduced diameter portion 124 of the opening 123 is a diaphragm 129 of smaller diameter than the diaphragm 126. The diaphragm 129 is secured in place on a step 128 by a securing ring 130. Supported centrally of the diaphragms 126 and 129 is a piston 131 provided with a central opening 132 for receiving the flexible member 121 for securing purposes as by a securing bead 133. The cylinder 123 and reduced portion 124, located between the diaphragms 126 and 129, is provided with an inlet pipe 134 connected to a pitot tube or other similar device 135 subjected to ram air pressures in response to vehicle movement through the atmosphere. Likewise, the pressure responsive member 122a is also connected to the pitot tube 135 by the pipe 136 in order to respond to ram air pressures proportional to the vehicle speed.

It can be seen that as the pressure increases into the head of the pitot tube 135 and thus in the areas between the diaphragms of the pressure responsive devices 122 and 122a, the area differential of these diaphragms causes the piston 131 of the pressure responsive device 122 and the piston 137 of the pressure responsive device 122a to develop increased tension in the flexible member 121. For the small precessional angles through which the gyro moves, the stiffness restraint introduced by the tension elements 121 acting on radial levers 116 is essentially proportional to the applied control pressure established by the pitot tube. Design parameters may be chosen to produce the required velocity sensitivity calibration pattern.

In order to prevent over control of a vehicle moving through space at high speeds or under-control of the vehicle moving through space at low speeds, the pressure biasing device is necessary. Without the pressure biasing device, stability augmentation could only be established at some desired average speed thus resulting in over-control at high speeds and under-control at lower speeds.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

What is claimed is:

1. A rate of change responsive valve comprising first and second opposing orifices, a control vane means positioned midway between said orifices and movable between two extreme positions in response to input control signals, a first reduced pressure pipe associated with said first orifice, a second reduced pressure pipe associated with said second orifice, a fluid responsive control valve responsive to a differential of said pressures in said first and second reduced pressure pipes, a feedback piston, resilient means connecting said vane means to said feedback piston, said piston having opposing faces subjected to fluid pressures proportional to fluid pressures within said first and second pressure pipes, said feedback piston being displaced in response to vane affected fluid pressures and in a direction to urge said vane to return to said midway position.

2. A rate of change responsive valve comprising first and second opposing orifices, a control vane means positioned midway between said orifices and movable between two extreme positions in response to input control signals, a first reduced pressure pipe associated with said first orifice, a second reduced pressure pipe associated with said second orifice, a fluid responsive control valve responsive to a differential of said pressures in said first and second reduced pressure pipes, a feedback piston, resilient means connecting said vane to said feedback piston, said piston having opposing faces subjected to fluid pressures proportional to fluid pressures within said first and second pressure pipes, said feedback piston being displaced in response to vane affected fluid pressures and in a direction to urge said vane to return to said midway position, said vane being returned to said midway position during long duration input signals.

3. A rate of change responsive valve comprising first and second opposing orifices, a control vane means positioned midway between said orifices and movable between two extreme positions in response to input gyro control signals, a first reduced pressure pipe associated with said first orifice, a second reduced pressure pipe associated with said second orifice, a fluid responsive control valve responsive to a differential of said pressures in said first and second reduced pressure pipes, a feedback piston connected to said vane means through a resilient means, said piston having opposing faces subjected to fluid pressures proportional to fluid pressures within said first and second pressure pipes, said feedback piston being displaced in response to vane means affected fluid pressures and in a direction to urge said vane to return to said midway position, said vane being returned to said midway position during prolonged gyro signals.

4. A rate of change responsive valve comrising first and second opposing orifices, a control vane means positioned midway between said orifices and movable to two extreme positions in response to input control signals, a first reduced pressure pipe associated with said first orifice, a second reduced pressure pipe associated with said second orifice, a fluid responsive control valve responsive to a differential of said pressures in said first and second reduced pressure pipes, a feedback piston, a resilient means connecting said vane to said feedback piston, said piston having opposing faces subjected to fluid pressures proportional to fluid pressures within said first and second pressure pipes, said feedback piston being displaced at a velocity proportional to vane affected fluid differential pressures and in a direction to urge said vane to return to said midway position, said resilient and piston damper means comprising a system of long period.

5. A rate of change responsive valve comprising first and second opposing orifices, a gyro control vane positioned midway between said orifices and movable to two extreme positions in response to gyro control signals, a first reduced pressure pipe associated with said first orifice, a second reduced pressure pipe associated with said second orifice, a fluid responsive control valve responsive to a differential of said pressures in said first and second reduced pressure pipes, a feedback piston, a resilient means connecting said vane to said feedback piston, said piston having opposing faces subjected to fluid pressures proportional to fluid pressures within said first and second pressure pipes, said feedback piston being displaced at a velocity in response to vane affected fluid pressures and in a direction to urge said vane to return to said midway position, said vane being returned to said midway position during prolonged gyro input signals, a second stage control portion responsive to said pressure differential in said first and second pressure differential pipes, said second stage control portion providing output control pressures in response to short duration gyro input signals.

6. A rate of change responsive valve comprising first and second opposing orifices, a gyro control vane positioned midway between said orifices and movable to two extreme positions in response to gyro control signals, a first reduced pressure pipe associated with said first orifice, a second reduced pressure pipe associated with said second orifice, a fluid responsive control valve responsive to a differential of said pressures in said first and second reduced pressure pipes, a feedback piston, resilient means connecting said vane to said feedback piston, said piston having opposing faces subjected to fluid pressures proportional to fluid pressures within said first and second pressure pipes, said feedback piston being displaced in response to vane affected fluid pressures and in a direction to urge said vane to return to said midway position, said gyro control vane being biased to said midway position, said vane movement between its said two extreme positions being relatively small in comparison to the movement of said feedback piston.

7. A rate of change responsive valve comprising first and second opposing orifices, a gyro control vane positioned midway between said orifices and movable to two extreme positions in response to gyro control signals, a first reduced pressure pipe associated with said first orifice, a second reduced pressure pipe associated with said second orifice, a fluid responsive control valve responsive to a differential of said pressures in said first and second reduced pressure pipes, a feedback piston, resilient means connecting said vane to said feedback piston, said piston having opposing faces subjected to fluid pressures proportional to fluid pressures within said first and second pressure pipes, said feedback piston being displaced in response to vane affected fluid pressures and in a direction to urge said vane to return to said midway position, said gyro control vane being biased to said midway position, said vane movement between its said two extreme positions being relatively small in comparison to the movement of said feedback piston, said resilient means being a spring of very low stiffness characteristics.

8. A rate of change responsive valve comprising first and second opposing orifices, a fluid control member movable between two extreme positions adjacent said first and second orifices and biased to a position substantially midway between said orifices, feedback means responsive to long duration displacements of said control member toward one of said control member extreme positions for returning said control member to its midway position, and actuator means responsive to dynamic displacements of said fluid control member.

9. A rate of change responsive valve comprising first and second opposing orifices, a fluid control member movable between two extreme positions adjacent said first and second orifices and biased to a position substantially midway between said orifices, feedback means responsive to long duration displacements of said control member toward one of said control member extreme positions for returning said control vane to its midway position, said first and second orifices having first and second reduced pressure means associated therewith, said feedback means comprising a pressure responsive member capable of displacement in response to a dynamic pressure differential of said first and second reduced pressure means, and actuator means responsive to said pressure differential of said first and second reduced pressure means.

10. A rate of change responsive valve comprising first and second opposing orifices, a fluid control member movable between two extreme positions adjacent said first and second orifices and biased to a position substantially midway between said orifices, feedback means responsive to long duration displacements of said control member toward one of said control member extreme positions for returning said control member to its midway position, said first and second orifices having first and second reduced pressure means associated therewith, said feedback means comprising a pressure responsive member capable of displacement in response to a dynamic pressure differential of said first and second reduced pressure means, resilient means for connecting said pressure responsive member to said control member, and actuator means responsive to a dynamic pressure differential of said first and second reduced pressure means.

11. A rate of change responsive valve comprising first and second opposing orifices, a fluid control member movable between two extreme positions adjacent said first and second orifices and biased to a position substantially midway between said orifices, feedback means responsive to long duration displacements of said control member toward said control member extreme positions for returning said control member to its midway position, said first and second orifices having first and second reduced pressure means associated therewith, said feedback means having a pressure responsive member capable of displacement in response to a pressure differential of said first and second reduced pressure means, control means responsive to said control member for providing control member displacement proportional output pressures, and resilient means for connecting said pressure responsive member to said control member, said resilient means having a long natural frequency period.

References Cited in the file of this patent

UNITED STATES PATENTS

| | | |
|---|---|---|
| 2,053,797 | King | Sept. 8, 1936 |
| 2,209,735 | Lauch | July 30, 1940 |
| 2,283,753 | Harcum | May 19, 1952 |
| 2,584,125 | Haglund | Feb. 5, 1952 |
| 2,667,077 | Baecher | Jan. 26, 1954 |
| 2,709,421 | Avery | May 31, 1955 |
| 2,742,916 | Side | Apr. 24, 1956 |
| 2,789,543 | Popowsky | Apr. 23, 1957 |
| 2,790,427 | Carson | Apr. 30, 1957 |
| 2,797,666 | Chubbuch | July 2, 1957 |
| 2,838,028 | Erbguth | June 10, 1958 |

FOREIGN PATENTS

| | | |
|---|---|---|
| 539,310 | Canada | Apr. 9, 1957 |